Figure 1:
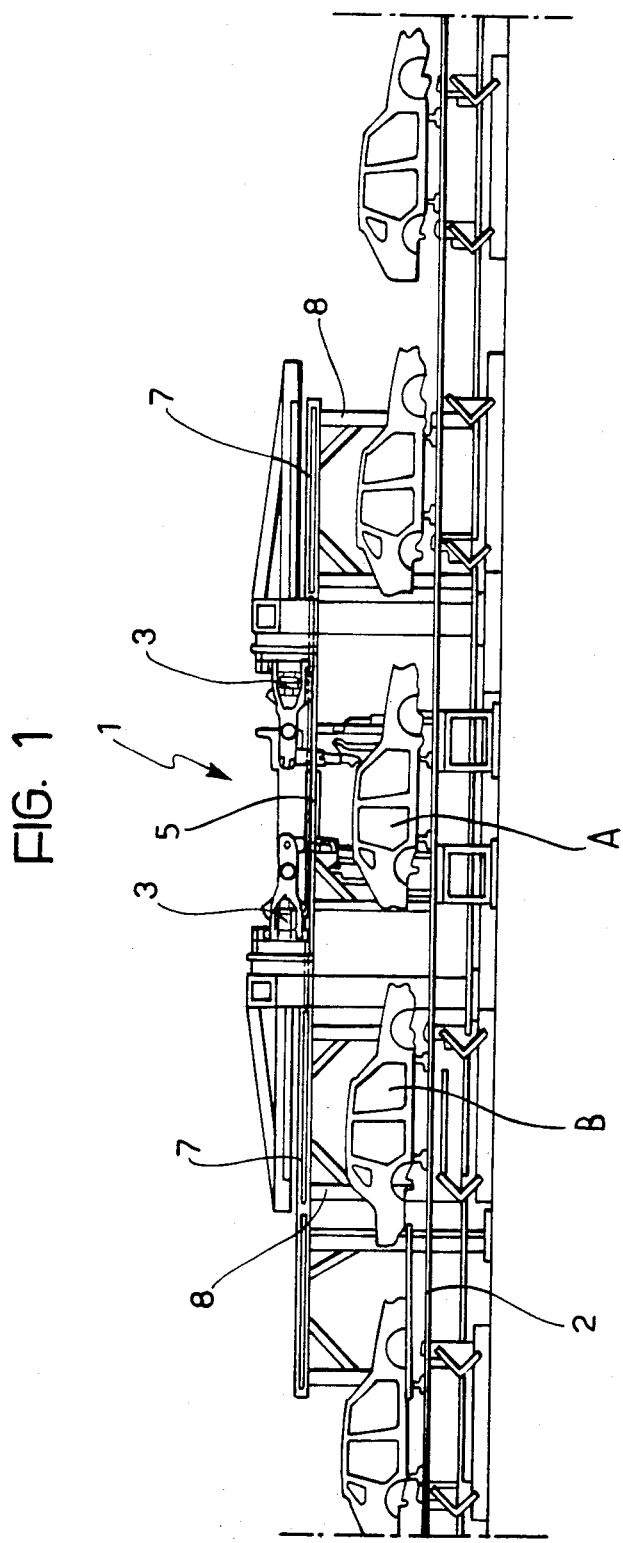

United States Patent [19]

Bossotto et al.

[11] Patent Number: 4,682,722
[45] Date of Patent: Jul. 28, 1987

[54] WELDING SYSTEMS FOR MOTOR VEHICLES BODIES

[75] Inventors: Piero Bossotto; Mario Brandino, both of Turin, Italy

[73] Assignee: Comau S.p.A., Italy

[21] Appl. No.: 834,215

[22] Filed: Feb. 27, 1986

[30] Foreign Application Priority Data

Feb. 28, 1985 [IT] Italy .............................. 67213 A/85

[51] Int. Cl.⁴ .......................................... B23K 37/04
[52] U.S. Cl. ..................................... 228/41; 228/47; 219/79
[58] Field of Search .................... 29/568; 228/4.1, 45, 228/47; 104/49, 96; 219/79, 80

[56] References Cited

U.S. PATENT DOCUMENTS

| | | | |
|---|---|---|---|
| 583,353 | 5/1897 | Anderson | 104/49 |
| 2,894,460 | 7/1959 | Klamp | 104/96 |
| 3,404,636 | 10/1968 | Kavieff | 104/96 |
| 4,162,387 | 7/1979 | De Candia | 219/79 |
| 4,494,687 | 1/1985 | Rossi | 228/4.1 X |

Primary Examiner—Kenneth J. Ramsey
Attorney, Agent, or Firm—Fred A. Keire

[57] ABSTRACT

In a system for the automatic welding of motor vehicle bodies, adapted to operate on at least two different types of body, the parts of a loosely preassembled body accurately positioned, in order to be welded by programmable welding robots, by means of positioning tools carried by side gates located on both sides of the conveyor line for the bodies. At least two pairs of side gates are provided having positioning tools corresponding to two different types of body. The side gates are movable on guide means provided on the two sides of the conveyor line to allow the rapid replacement of the pair of side gates in the operative position at the welding station, in dependence on the type of body to be welded. According to the invention, the system includes a store of auxiliary side gates having positioning tools corresponding to different types of body, and means for replacing any one of the two pairs of side gates which are on the two sides of the line by any one of the pairs of auxiliary side gates which are in the store.

2 Claims, 3 Drawing Figures

WELDING SYSTEMS FOR MOTOR VEHICLES BODIES

The present invention relates to systems for welding motor vehicle bodies constituted by pressed sheet metal elements, adapted to operate automatically on at least two different types of body, of the type comprising a welding station,
a conveyor line for conveying through the welding station a loosely preassembled motor vehicle body,
means for accurately positioning the underbody part of the said loosely preassembled body at the said welding station,
a plurality of pairs of side gates on the two sides of the conveyor line,
a series of positioning tools carried by each pair of side gates for accurately positioning the various parts of the body relative to the said underbody part, the positioning tools carried by each pair of said gates being adapted to the configuration of a corresponding type of body,
the said gates also being movable into or away from an operative position on guide means provided at the two sides of the conveyor line to allow the rapid replacement of the pair of side gates located in said operative position at the welding station, in dependence on the type of body to be welded,
each pair of said gates also being movable between a spaced apart condition for the introduction of the body to be welded to the welding station, and a relatively close condition in which the positioning tools engage the body and locate the various parts thereof in the welding configuration, and
means for welding the bodies, comprising a series of programmable welding robots.

A system of the type specified above is described and illustrated in UK Pat. No. 1,564,669.

The object of the present invention is to improve such known system enhancing particularly its operational flexibility.

The main characteristic of the system according to the invention lies in the fact that it includes a store of auxiliary side gates having positioning tools corresponding to different types of body and movable support means for the side gates which are movable between a first position in which they are arranged to receive a pair of side gates when the latter are brought away from the operative position, and a series of further positions for the transfer of the side gates to and from the store by the movable support means.

In a preferred embodiment, in which the guide means comprise longitudinal guides parallel to the body-conveyor line, the end portions of the longitudinal guides are separate portions carried by the movable support means of the side gates, and the movable support means include gate structures rotatable about a vertical axis in correspondence with one of their end edges. A store of auxiliary side gates is provided adjacent each gate structure, which includes a series of fixed structures for supporting the auxiliary side gates in substantially radial planes relative to the axis of articulation of the corresponding gate structure, each of the said fixed structures having a guide member which is an extension of the guide of the corresponding gate structure when it is located in correspondence with the fixed structure.

Figure 2:
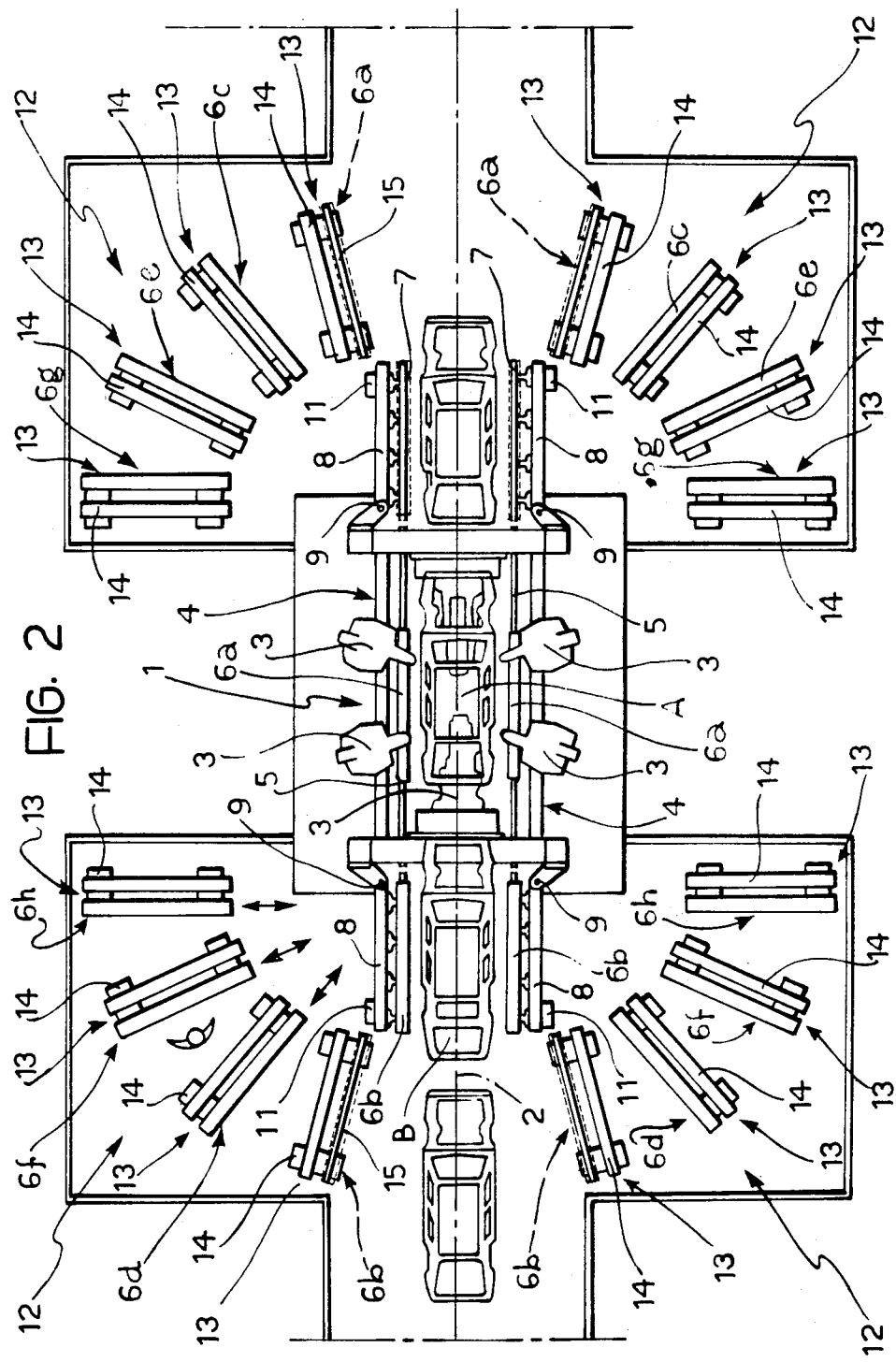
Figure 3:
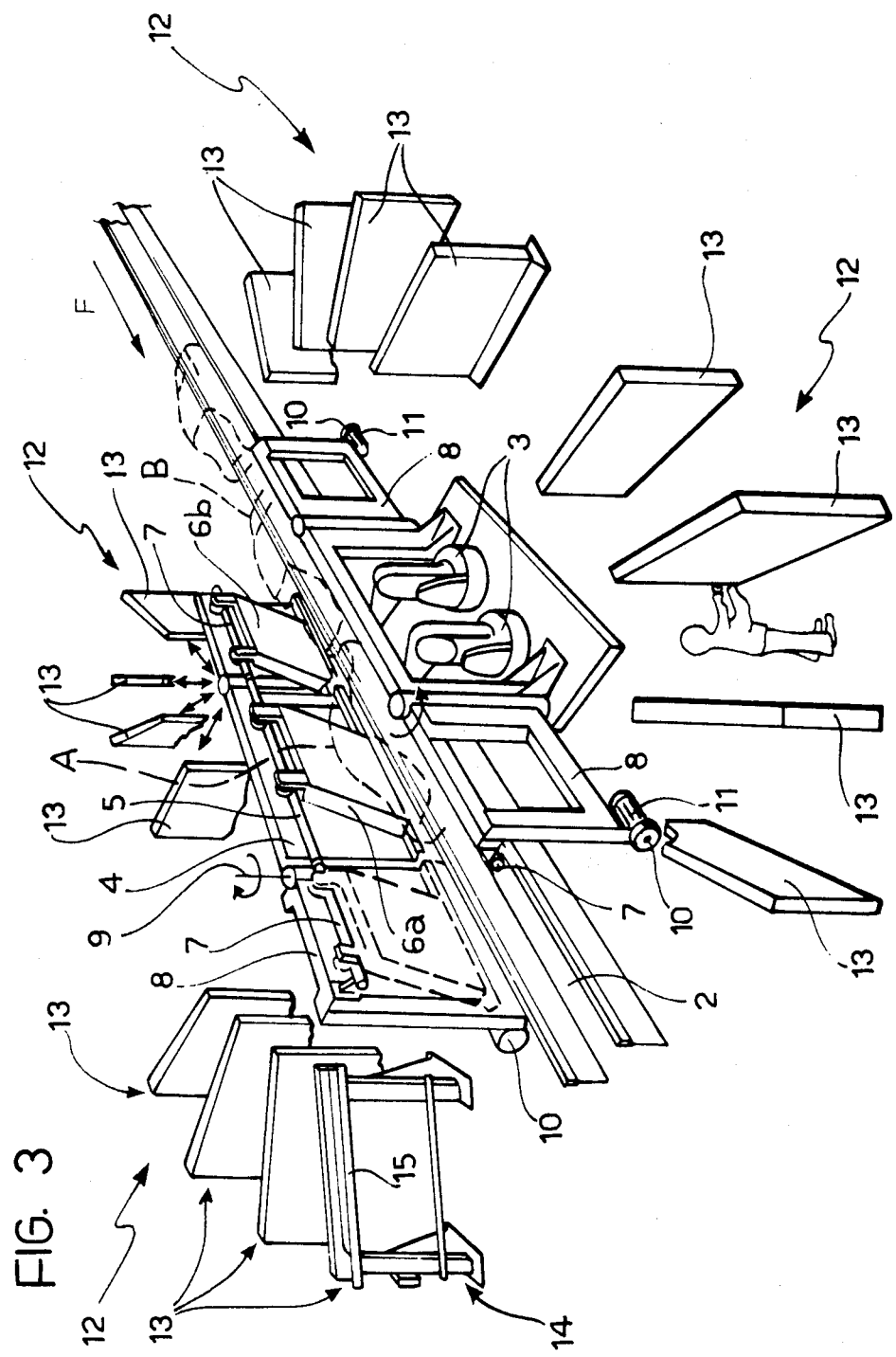

Further characteristics and advantages of the present invention will emerge from the description which follows with reference to the appended drawings, provided purely by way of non-limiting example, in which:

FIG. 1 is a schematic side-elevational view of a welding system for motor vehicle bodies according to the invention, FIG. 2 is a plan view of the system in FIG. 1, FIG. 3 is a schematic perspective view of the system of FIGS. 1 and 2.

The welding system illustrated by way of example in the appended drawings is adapted to operate on eight different types of motor vehicle body.

The welding system includes a welding station 1 and a conveyor line 2 for carrying the bodies to be welded through the welding station 1. The means for controlling the movement of the bodies along the conveyor line 2 may be of any known type. These means are not illustrated in detail in the appended drawings since they do not fall within the scope of the present invention. Furthermore, their elimination from the drawings makes the latter easier to understand.

The bodies to be welded reach the inlet end of the conveyor line 2 after having been assembled by loosely connecting their parts. Usually this loose connection is achieved by the bending of a series of tongues projecting from some of the parts of the body and by the engagement of the bent tongues with adjacent parts. The connection thus achieved is a labile connection, that is, it allows a certain degree of play between the various parts connected, whereby it is necessary to locate each part of the body in a precise position when the body is subjected to the welding operation at the station 1. This welding is carried out by a series of programmable welding robots 3.

The welding station 1 illustrated in the drawings is a "framing" station. This means that solely "framing" of the body is carried out at the welding station by the application of a predetermined number of spot welds, so as to give the structure stability. The body thus welded is then conveyed to subsequent welding stations which complete the assembly of the body by the carrying out of further spot welding.

Similarly to what is explained in the UK Pat. No. 1,564,669, the welding station 1 includes fixed structures 4 which carry two overlying longitudinal horizontal guides 5 on which two pairs of side gates 6a, 6b are slidable.

In the example illustrated, the structure of the side gates and the tools provided thereon, the means for supporting and guiding these gates, and the means for moving the side gates along the two sides of the conveyor line are exactly the same as those illustrated in the aforesaid UK patent and do not fall within the scope of the present invention.

The side gates carry, in known manner, positioning tools (not illustrated) for engaging the lateral and upper parts of the body so as to locate them in a precise position during welding. The underbody part of the body, however, is located by further positioning tools arranged in the lower part of the welding station or, which are carried by the support platform for each body, as illustrated in the UK patent.

Each pair of side gates has positioning tools adapted to the particular configuration of a respective type of body. The pairs of side gates which engage the longitudinal guides 5 may be moved along these guides so as to carry the pair of side gates corresponding to the type of body to be welded into the operative position at the welding station. When a body of a type different from that on which the welding station has operated immediately beforehand arrives at the welding station, the pair of said gates which are at the welding station may be replaced rapidly by sliding on the respective guides 5.

With reference to FIG. 2, a first type of body A is at the welding station and its parts are located in a precise position during the welding by the positioning tools carried by the pair of side gates 6a.

In the illustrated case, the body of type A which is at the welding station is followed by a body of a second type B. The positioning tools arranged to locate the various parts of the type-B body during welding are provided on the pair of side gates 6b. As illustrated in the above-identified UK patent, when the body A leaves the welding station and the subsequent body B enters the welding station, the movement of the bodies along the conveyor line is accompanied by a corresponding longitudinal movement of the two pairs of side gates 6a, 6b along the guides 5, so as to bring the two side gates 6a into a waiting position (illustrated in broken outline) adjacent the outlet end of the welding station and the lateral frames 6b into the operative position.

Again according to the teachings of the aforesaid UK patent, each pair of side gates is movable between a downwardly-diverging spaced apart condition (illustrated in FIG. 3) to allow a new body to be welded to enter the welding station, and a relatively close condition in which the side gates lie in vertical planes and their positioning tools engage the lateral and upper parts of the body to locate them in a precise position. As described in UK Pat. No. 1,564,669, the movement of the said gates between the spaced apart condition and the close condition is achieved, in the embodiment illustrated, by the pivoting of the side gates about a longitudinal axis located in correspondence with the guides 5. The details of the connection between the side gates and their support structure which allows the pivoting is also not described in detail in the present specification since it is known in itself.

As illustrated in FIG. 3 (wherein the direction of movement of the car bodies is indicated by arrow F) the londitudinal guides 5 have end separate portions 7 which are carried by gate structures 8 articulated about vertical axes 9 in correspondence with their vertical end edges adjacent the fixed structure 4. Each gate structure 8 has means for rotating it about its articulation 9. These means may, for example, be constituted by a wheel 10 which engages the floor and is rotated by a motor 11 carried by the gate structure 8.

Adjacent each gate structure is a store of auxiliary side gates 12 including a series of stations 13 constituted by fixed structures 14 each provided with an upper horizontal guide member 15 arranged to support a corresponding auxiliary side gate for sliding movement. The fixed structures 14 are located in substantially radial planes relative to the pivot axis 9 of the corresponding gate structure 8 whereby the latter may be brought into a series of transfer positions, in each of which the upper guide portion 7 is aligned with the guide member 15 of a fixed structure 14 of the store 12. Thus it is possible to transfer a side gate between a station of the store 12 and the corresponding gate structure.

As is clear from the description above, the use of the stores 12 of auxiliary side gates allows the flexibility of the system to be increased. In the embodiment illustrated, for example, two stores 12 are provided on each side of the conveyor line, each including four different stations corresponding to a total of eight different types of frame (indicated 6a, 6b, 6c, 6d, 6e, 6f, 6g, 6h in FIG. 2) intended to operate on the same number of body types.

In use, two pairs of side gates are arranged at the welding station, one of which corresponds to the type of body which is at the welding station and the other of which corresponds to the immediately subsequent type of body. When the latter body enters the welding station, the side gates which have operated on the preceding body are brought away from the operative position on the guides 7 carried by two corresponding gate structures 8. When, in this situation, the body following that which is at the welding station is different again from the two bodies which preceded it, the side gates which are at the waiting position are returned to the corresponding stores by rotation of the gate structures 8 and the translational movement of the side gates from the gate structures to the guide members 15 of the corresponding storing stations. The gate structures 8 are then brought to the storing stations 12 in which the side gates of the type adapted to operate on the body which will enter the welding station are located. These side gates are now tranferred from the fixed structures 14 supporting them to the two gate structures 8 and the latter are returned to the operative position illustrated in FIG. 3 so as to locate the gates rapidly as replacements for the side gates at the welding station.

During the periods of time when particular types of side gates are in the stores 12, these gates are readily accessible to operators (diagrammatically illustrated in FIGS. 2, 3) for any maintenance or repair.

From the description above it is clear that the system according to the invention may be put into effect by the simple adaptation of known systems like those illustrated, for example, in the cited UK patent.

Naturally, the principle of the invention remaining the same, the constructional details and forms of embodiment may be varied widely with respect to that described and illustrated purely by way of example, without thereby departing from the scope of the present invention.

We claim:

1. System for welding motor vehicle bodies constituted by pressed sheet metal elements, adapted to operate automatically on at least two different types of body, comprising:
   a welding station;
   a conveyor line for conveying through the welding station a loosely preassembled motor vehicle body;
   means for accurately positioning the underbody part of said loosely preassembled body precisely at said welding station,
   a plurality of pairs of side gates on the two sides of the conveyor line;
   a series of positioning tools carried by each pair of side gates for accurately positioning the various parts of the body relative to said underbody part, the positioning tools carried by each pair of side gates being adapted to the configuration of a corresponding type of body;
   longitudinal guide means provided at the two sides of the conveyor line, said side gates being movable parallel to the conveyor line on said longitudinal guide means into or away from an operative position to allow the rapid replacement of the pair of side gates located in said operative position at the welding station, in dependence on the type of body to be welded, each pair of side gates being also movable between a spaced apart condition for the introduction of the body to be welded to the welding station, and a relatively close condition in which the positioning tools engage the body and locate the various parts thereof in the welding configuration;

means for welding the body; and a store of auxiliary pairs of side gates having positioning tools corresponding to further different types of body, wherein the longitudinal guide means have separate end guide portions, wherein movable support means are provided for carrying said end guide portions, wherein the movable support means include gate-like support structures, each gate-like support structure being rotatable about a vertical axis between a first position in which the respective end guide portion is parallel to the conveyor line, so that it can receive a side gate when the latter is brought away from its operative position and a series of further positions for the transfer of the side gate to and from the store by the gate-like support structure, wherein the store of auxiliary pair of side gates includes a series of fixed structures located adjacent to each gate-like support structure, for supporting the auxiliary side gates in substantially radial planes relative to the axis of articulation of the respective gate-like structure, each of said fixed structures having a guide member which is aligned with the guide portion of the respective gate-like support structure when the latter is located in the corresponding transfer postion, and wherein each gate-like support structure is provided with means for rotating it about its articulation axis.

2. A system for welding motor vehicle bodies as in claim 1, wherein the means for welding the body comprises a series of programmable welding robots.

* * * * *